April 6, 1965  N. M. SULLIVAN  3,176,828
ACCUMULATING CONVEYOR HAVING SKEWABLE ROLLERS
Filed Nov. 6, 1962  2 Sheets-Sheet 1

INVENTOR:
NORMAN M. SULLIVAN
BY
MAHONEY, MILLER & RAMBO
BY
W. S. Rambo
ATTORNEYS April 6, 1965   N. M. SULLIVAN   3,176,828
ACCUMULATING CONVEYOR HAVING SKEWABLE ROLLERS
Filed Nov. 6, 1962   2 Sheets-Sheet 2
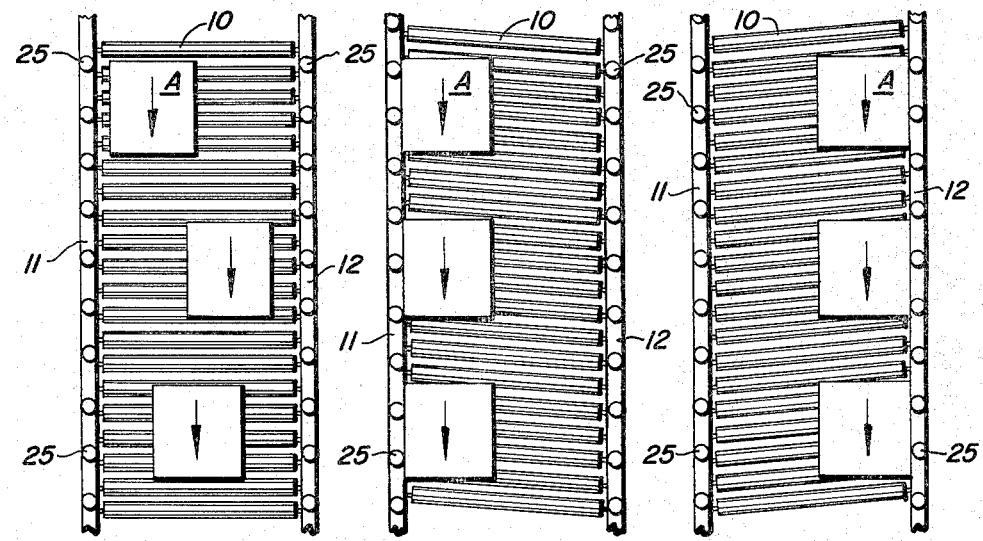
FIG. 3a   FIG. 3b   FIG. 3c
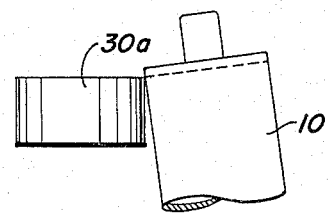   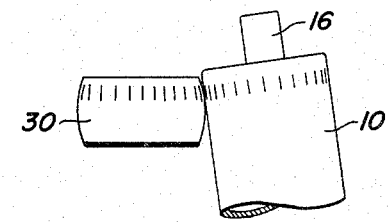
FIG. 4a   FIG. 4b
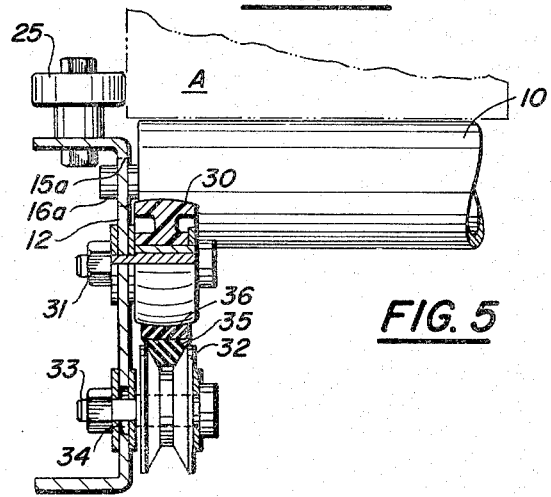   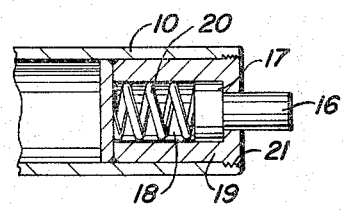
FIG. 5   FIG. 6
INVENTOR:
NORMAN M. SULLIVAN
BY
MAHONEY, MILLER & RAMBO
BY
ATTORNEYS

United States Patent Office 3,176,828
Patented Apr. 6, 1965

3,176,828
ACCUMULATING CONVEYOR HAVING SKEWABLE ROLLERS
Norman M. Sullivan, Cincinnati, Ohio, assignor to The Alvey-Ferguson Company, Cincinnati, Ohio, a corporation of Ohio
Filed Nov. 6, 1962, Ser. No. 235,629
6 Claims. (Cl. 198—127)

This invention relates to a driven roller conveyor of the accumulating type. It relates, more specifically, to that general type of conveyor in which articles are supported on rollers which are positively driven to move the articles along the conveyor as distinguished from gravity roller conveyors in which the rollers are not driven but are free-running and inclined downwardly so that gravity is relied upon to move the articles over the rollers and along the conveyor.

This type of driven conveyor is often employed as an accumulating conveyor and the driven rollers serve as a moving bed or surface for the conveyance of articles such as cartons, boxes, packages, and containers of all types. At its discharge end, the conveyor is usually provided with a stop, usually releasable, against which the leading article is moved so that articles successively supplied by the conveyor may accumulate in varying quantity adjacent the discharge end thereof.

The present invention provides an arrangement in a longitudinally extending driven roller conveyor of the type indicated whereby the articles carried thereby are caused to accumulate selectively at one side or the other of the longitudinal axis of the conveyor. The purpose of this accumulation at one side or the other is to get the articles in line as much as possible so that accumulation can be accomplished. According to this inventon, there is a force driving the articles into guard or guide means at one side or the other of the conveyor. Therefore, this accumulation is accomplished regardless of the size of the articles and even though the successive articles being carried by the conveyor are in a variety of sizes. If the articles were not aligned to this extent, the driving pressure on the articles would cause the line to buckle and result in a complete disarray of packages, possibly jamming the conveyor or throwing off some of the articles. The rollers are driven by intermittent drive means of such special design as to reduce the pressure which would otherwise build up when a line or row of articles is blocked by the stop and the drive continues to function and which sometimes causes collapsing or distortion of the articles, especially the leading articles. This intermittent drive is so designed that it is operative effectively to drive the rollers when the conveyor is adjusted to move the articles in a straight line, according to the position on the rollers in which the articles are initially placed, or when it is adjusted to accumulate the articles at one side or the other of the conveyor.

In the accompanying drawings, there is illustrated one example of a driven roller conveyor of the accumulating type in which this invention is embodied, but it is to be understood that this is for illustration only and that the invention may be embodied in other conveyor arrangements.

In these drawings:

FIGURE 3a is a schematic plan view illustrating the disposition of the article-supporting rollers with their axes at right angles to the side rails so that each article supported thereby moves along a straight path.

FIGURE 3b is a view similar to FIGURE 3a but showing the article-supporting rollers skewed so that their axes are in such angular relationship to the side rails that the conveyed articles will be moved toward a selected one of the rails.

FIGURE 3c is a view similar to FIGURE 3b but with the article-supporting rollers skewed in the opposite direction so that the conveyed articles will be moved toward the other of the side rails.

FIGURE 4a is a schematic view showing one type of driving wheel arrangement.

FIGURE 4b is a similar view showing the driving wheel arrangement provided by this invention.

FIGURE 5 is an enlarged vertical sectional view taken along line 5—5 of FIGURE 2 showing the driving arrangement.

FIGURE 6 is a detail in axial section of the mounting spindle plunger at one end of one of the article-supporting rollers.

With reference to the drawings, for purpose of illustration, there is shown a conveyor embodying this invention which comprises mainly the transversely extending driven supporting rollers 10 which are carried in a special manner by the longitudinally extending, laterally spaced, parallel side rails 11 and 12. The rails 11 and 12 are preferably formed of outwardly facing channels which are supported at a proper level in horizontal position, for example, by means of legs 13 suitably braced and attached to the side rails.

Figure 1:
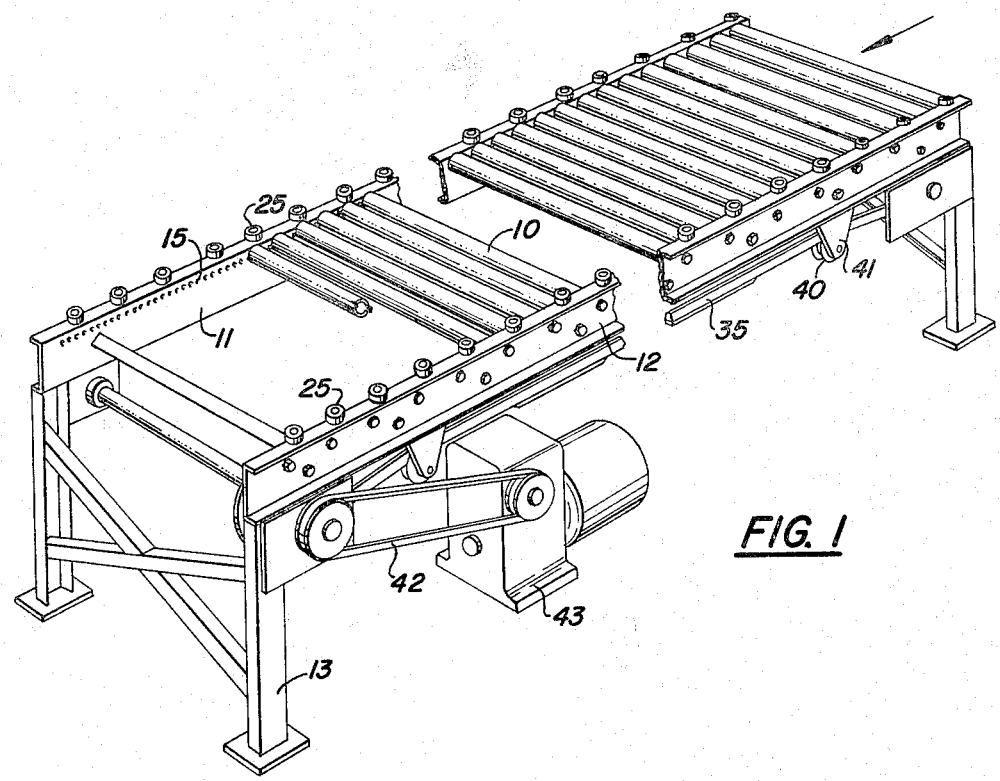
FIGURE 1 is a perspective view, partly broken away, of a conveyor embodying this invention, some of the parts being removed for clarity.

In FIGURES 1 and 3a, the rollers 10 are shown carried by the side rails 11 and 12 with their axes normal to or at right angles to the respective rails 11 and 12. However, the rollers are so carried by the rails that they can be adjusted relative thereto to dispose them in a skewed position with their axes at an angle or skewed relative to the side rails. This is illustrated in FIGURES 3b and 3c where the rollers are skewed in opposite directions.

To permit this adjustment to skew the rollers 10 as desired, one of the rails 11 and 12 is provided with inwardly opening, spindle-receiving transverse sockets or openings 15, the openings being shown in the rail 11, the opposed openings in opposite rails being in axial alignment. The openings 15 are arranged in a horizontal row in the channel rail and each row consists of longitudinally spaced openings.

One end of each roller 10, that is the end cooperating with the rail 11, is constructed in the manner shown in FIGURE 6 so that it is provided with a plunger-type axle or spindle 16 for cooperating with a selected opening 15. This spindle has a collar 17 on its inner end which is slidably mounted for limited axial movement in a chamber 18 within a cylindrical housing 19. A compression spring 20 within the chamber 18 normally forces the collar 17 outwardly into contact with the outer wall of the housing 19 and, therefore, slidably projects the spindle 16 to its outermost or extended position. The housing 19 may be suitably secured within the outer end of the hollow sleeve-like roller 10 as by a threaded connection 21. Thus, it will be apparent that the retractable spindles 16 at the one end of each roller 10 may be positioned in selected openings 15 in the associated rail 11.

The opposite end of each roller 10 is carried by the rail 12. For this purpose, the rail 12 is provided with a series of longitudinally spaced openings 15a, one of which is shown in FIGURE 5 and is designed to receive a fixed spindle 16a which is provided on that end of each roll. The openings 15a are oversize as compared to the spindle 16a. The openings 15a are in transverse alignment with certain of the openings 15 but the openings 15 are in greater number and spaced closer than the openings 15a as will be apparent later. Because of the yieldably mounted axle or spindle 16 at the one end, it is possible to selectively position it in one of several of the openings 15 in the rail 11. If the selected opening 15 is in alignment with the opposed opening 15a in the rail 12, the roller 10 will be positioned straight across or normal to the rails 11 and 12 as indicated in FIGURE 3a. If the opening 15 in which the spindle 16 is positioned is out of alignment with the opposed opening 15a, the roller 10 will be skewed in one direction or the other as indicated in FIGURES 3b or 3c. The oversize opening 15a permits the necessary angular movement of the spindle 16a relative to the rail 12.

The arrangement just described is desirable for skewing the rollers 10. However, other arrangements are possible. For example, once the desirable amount of skew has been established, it is possible to punch the spindle-receiving holes in one rail in offset relationship to the holes in the opposite rail. Also, it is not necessary that actual holes be used but the rails can be provided with upwardly opening notches for receiving the spindles which then may be fixed spindles rather than plunger type spindles as described above.

When the driven rollers 10 are normal to the rails 11 and 12, as shown in FIGURE 3a, and the articles A are positioned thereon, they will travel in straight lines. However, when the driven rollers 10 are skewed as in FIGURE 3b, the articles A will be moved to the left toward the side rail 11. When the rollers are skewed as in FIGURE 3c, the articles A will be moved to the right toward the side rail 12. Therefore, the side rail toward which the articles are to be moved is provided with positioning or guard means to engage and guide the articles as they are moved to the side edge of the conveyor. This means may be in the form of wheels 25 which are disposed for free rotation about vertical axes and have their faces above the plane of the upper surfaces of the rollers 10. These wheels are preferably provided at both sides of the conveyor and are suitably mounted at longitudinally spaced intervals on the upper flange of the respective rail channel.

It will be apparent that with the rollers 10 skewed the articles A will accumulate at the selected side of the conveyor. This will be true regardless of the size of the articles and even though successive articles vary in size.

Figure 2:
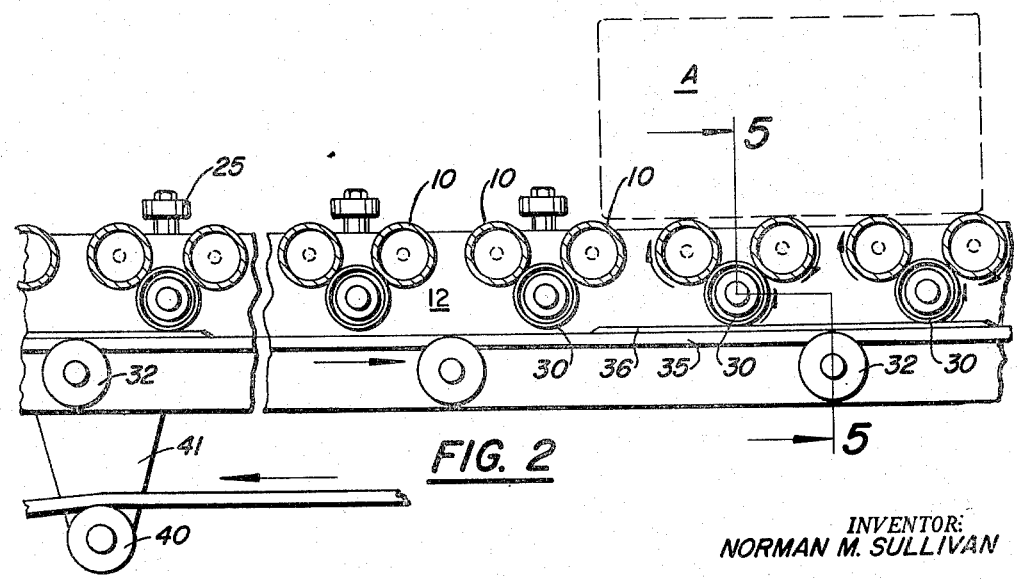
FIGURE 2 is a fragmentary vertical longitudinal sectional view through the main structure of the conveyor illustrating the roller driving arrangement.

The driving means for the rollers 10 will function effectively regardless of whether the rollers are straight across the conveyor or are skewed in either direction. This driving means includes a plurality of longitudinally spaced driving rollers or wheels 30 which are mounted on the inside of the rail having the relatively fixed roller spindles 16a in the openings 15a, that is the rail 12. The wheels are mounted on the rail 12 with their axes in fixed position, by means of the axle assemblies 31. The wheels are preferably provided with faces of suitable material, such as nylon, and the face of each driving wheel is curved or crowned transversely as indicated in FIGURES 4b and 5. Each of the crowned wheels is mounted in contact with two upper adjacent driven rollers 10, as indicated in FIGURE 2, although it is possible to engage only one roller with one driving wheel.

The cooperation of the crowned wheel 30 with the driven roller 10 is illustrated schematically in FIGURE 4b. It will be apparent that with the driven roller 10 having its axis straight across the conveyor or angled in either direction relative to the axis of the wheel 30 there will be a line of driving contact and this will vary along the roller 10, depending on the relative angle of the roller axis. On the other hand, if the periphery of the driving wheel was exactly cylindrical, as indicated at 30a in FIGURE 4a, and the roller 10 was angled, the line of contact would be at one edge or the other of the wheel 30a at all times which would produce grooves or undesirable wear on the roller 10 at two lines of contact corresponding to the inner and outer edges of the wheel 30a, the line of contact depending on the direction of skewing of the roller 10. Thus, the crowned driving wheel 30 at one end of the associated roller 10 will drive it effectively and with a minimum of wear and the wear will be desirably distributed. The angular adjustment of each roller 10 will cause it to fulcrum about the crowned surface of the cooperating drive wheel 30 and this will be permitted by the oversize openings 15a. The rails 11 and 12 may be straight as indicated, or curved.

The driving wheels 30 which are spaced longitudinally along the rail 12 are driven intermittently by means of an intermittent type belt drive disposed adjacent that rail. This belt drive is in the form of a V-belt 35, the upper run of which is carried by the grooved idler sheaves or rollers 32 that are mounted by suitable axle assemblies 33 at longitudinally spaced intervals along the rail 12. These axle assemblies are mounted for vertical adjustment in the vertical slots 34 formed in the rail. The V-belt 35 is of the endless type and has at longitudinally spaced intervals driving wheel-engaging pad projections or strips 36 which project upwardly from the upper run of the belt as shown in FIGURE 2. These strips 36 are of a selected length and each projects from the main run of the belt a desirable extent so that although the upper run of the belt itself does not engage the wheels 30, the successive pads 36 do. Thus, when each wheel 30 is engaged by a pad 36, it is driven in one direction and thus imparts opposite rotation to the conveyor rollers 10 which are engaged therewith. Thus, all the rollers 10 are driven in the same direction and will move the supported articles continuously along the conveyor until they are stopped. However, when stopped, the pressure on the line of articles will not be excessive since the rollers 10 are driven only by the successive projecting pads or strips 36 as compared to the entire length of the V-belt. Thus, the drive on the rollers 10 is intermittent. It will be noted from FIGURE 5 that each pad or strip 36 has a concave face of a transverse curve complemental to the transverse crowning of the wheels 30. However, the pads could have flat faces since the resiliency thereof would permit substantial conforming to the crown of the wheels.

Thus, it will be apparent that the upper run of the V-belt drive is provided with the raised projections which provide intermittent wheel-engaging driving portions and that these portions are at spaced intervals. Thus, the rollers 10 are only driven intermittently. The ends of the projection 36 may be inclined or beveled to facilitate engagement with the successive driving wheels 30. As each article A passes onto the accumulating conveyor, a pad or portion 36 will move into contact with one or more of the driving wheels 30 located beneath that article, as shown in FIGURE 2. Thereafter, the article will move continuously in unison with the pad, until the progress of the article is stopped by engagement with a stop (not shown) at the discharge end of the conveyor or with a preceding accumulated article. At this time, slippage in the drive can occur. Because of the provision of the intermittent drive through the narrow V-belt, the pressure exerted against the accumulated or stopped articles will be minimized even though the drive of the wheels 30 by the pads 36 continues.

The lower run of the V-belt 35 may be supported by rollers 40 suspended from the rail 12 by brackets 41 at suitable locations. The V-belt may be driven in any suitable manner as by a drive belt 42 driven by a reduction gear and motor unit 43 which may be suitably located on the frame of the conveyor or an adjacent supporting surface.

Thus, with this conveyor the driven article-supporting roller may be straight across the conveyor to cause the articles to move in a straight path or may be skewed to one side or the other to cause the articles to migrate toward and accumulate against the positioning and guide means provided at one rail or the other. Furthermore, even though the rollers are skewed, the intermittent V-belt drive will function effectively to drive the rollers. The drive will be through the crowned driving rollers or wheels which will properly engage the article-supporting rollers regardless of whether their axes are normal to the side rails or angularly disposed relative thereto. The crowned driving wheels insure good driving engagement regardless of the adjustment of the rollers. The V-belt drive with the raised driving surfaces at longitudinally spaced intervals along the belt provides intermittent drive for the article-supporting rollers so that undue pressure will not be produced on a line of articles stopped at the discharge end of the accumulating conveyor.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. An article-accumulating conveyor comprising a supporting frame including a pair of relatively spaced apart, parallel, longitudinally extending side rails; a plurality of cylindrical, article-conveying rollers extending generally transversely between said rails; means on said rails for rotatably supporting said rollers and providing for selective adjustment of said rollers between several different transversely angular positions with respect to said rails; and means for driving said rollers in rotation, said last-named means including a plurality of driving wheels each having a transversely crowned driving surface disposed in frictional driving engagement with at least one of said rollers regardless of the angularly adjusted position thereof.

2. An article-accumulating conveyor comprising a frame having transversely spaced, longitudinally extending, parallel side rails; a plurality of cylindrical article-conveying rollers disposed in generally horizontal, parallel relation and extending generally transversely between the side rails of said frame; means for rotatably supporting said rollers on said side rails and providing for selective adjustment of said rollers between right angular positions with respect to said side rails and opposite, angularly skewed positions with respect thereto; a plurality of friction drive wheels rotatably supported by said frame, each of said drive wheels having a transversely crowned peripheral surface disposed in driving engagement with at least one of said rollers in all positions of adjustment of said rollers; and an endless, flexible drive belt movably supported in said frame and engageable with said drive wheels to impart rotation to said rollers.

3. An article-accumulating conveyor as defined in claim 2, wherein said means for supporting said rollers comprise axle projections at the ends of said rollers and sets of longitudinally spaced sockets formed in one of said side rails for detachably receiving the axle projections of said rollers, said sets of sockets providing for the selective adjustment of each of said rollers between said right angular and oppositely skewed positions with respect to said side rails.

4. An article-accumulating conveyor as defined in claim 2, wherein each of said side rails are provided with a plurality of longitudinally spaced, upstanding, anti-friction guide rollers arranged to engage and guide articles deposited on said conveying rollers when the latter occupy angularly skewed positions with respect to said side rails.

5. An article-accumulating conveyor as defined in claim 2, wherein each of said drive wheels is engaged with two adjacent conveying rollers.

6. An article-accumulating conveyor as defined in claim 2, wherein said drive belt is provided with a plurality of longitudinally spaced, relatively thickened drive pads arranged to intermittently engage each of said drive wheels during movement of said belt.

References Cited by the Examiner
UNITED STATES PATENTS

| | | | |
|---|---|---|---|
| 633,572 | 9/99 | Neeland | 198—127 |
| 744,874 | 11/03 | Cromwell | 198—127 |
| 935,669 | 10/09 | Logan | 193—35 |
| 1,795,192 | 3/31 | York | 198—131 |
| 1,959,157 | 5/34 | Eggleston | 198—127 |
| 1,993,519 | 3/35 | Miltenberger | 193—35 |
| 2,030,816 | 2/36 | Fenton | 198—127 |
| 2,253,198 | 8/41 | Regan | 198—127 |
| 2,844,370 | 7/58 | Thomas | 193—37 |
| 3,127,003 | 3/64 | Goepper | 198—127 |

SAMUEL F. COLEMAN, *Acting Primary Examiner.*

WILLIAM B. LA BORDE, *Examiner.*